(12) United States Patent
Lim et al.

(10) Patent No.: US 7,093,871 B2
(45) Date of Patent: Aug. 22, 2006

(54) EXPANDABLE CARGO BOX ARRANGEMENT FOR A VEHICLE

(75) Inventors: Stephen T Lim, Farmington Hills, MI (US); Douglas J Quigley, Rochester, MI (US); Robert Smyczynski, Metamora, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 62 days.

(21) Appl. No.: 11/020,819

(22) Filed: Dec. 22, 2004

(65) Prior Publication Data

US 2006/0131911 A1    Jun. 22, 2006

(51) Int. Cl.
*B60P 3/34*    (2006.01)
(52) U.S. Cl. ............................. 296/26.08; 296/190.11
(58) Field of Classification Search ............. 296/26.08, 296/26.09, 190.11, 190.08, 183.1, 37.6
See application file for complete search history.

(56) References Cited

U.S. PATENT DOCUMENTS

| | | | | |
|---|---|---|---|---|
| 4,813,722 A | * | 3/1989 | Viscome et al. ............... | 296/63 |
| 4,932,709 A | * | 6/1990 | Wainwright .............. | 296/65.09 |
| 5,934,727 A | * | 8/1999 | Storc et al. ................. | 296/37.6 |
| 6,513,863 B1 | * | 2/2003 | Renke et al. ........... | 296/190.11 |
| 6,685,269 B1 | * | 2/2004 | Freijy et al. ................. | 297/332 |
| 6,698,829 B1 | * | 3/2004 | Freijy et al. .............. | 296/65.01 |
| 6,742,834 B1 | * | 6/2004 | Merritt et al. ............ | 296/26.11 |
| 6,786,535 B1 | * | 9/2004 | Grzegorzewski et al. .. | 296/37.6 |
| 6,796,600 B1 | * | 9/2004 | Ferer et al. ............. | 296/190.11 |
| 6,837,529 B1 | * | 1/2005 | Kharod et al. .......... | 296/190.11 |
| 6,959,960 B1 | * | 11/2005 | Buccinna et al. ....... | 296/190.11 |
| 2005/0029830 A1 | | 2/2005 | Mack et al. | |

* cited by examiner

*Primary Examiner*—Kiran B. Patel
(74) *Attorney, Agent, or Firm*—Thomas A. Jurecko

(57) ABSTRACT

An arrangement for expanding a cargo box of a pick-up truck vehicle is provided. The arrangement includes a wall that defines a cabin space on an internal side and a cargo box end on an external side, and the wall is arranged to be translateable from a first position to a second position. A latch mechanism is provided and attached to the wall. The latch mechanism is arranged to maintain the wall in the first position. A release mechanism is coupled to the latch mechanism and arranged to selectively release the wall from the first position such that the wall can translate into the cabin and towards a front of the vehicle to a second position and extend a length of the cargo box.

8 Claims, 14 Drawing Sheets

EXPANDABLE CARGO BOX ARRANGEMENT FOR A VEHICLE

FIELD OF INVENTION

The present invention relates generally to a cargo bed for a vehicle, and, more particularly, to an arrangement for expanding the cargo bed of a pick-up truck vehicle.

BACKGROUND OF INVENTION

Generally, pick-up truck vehicles today are available in a variety of cabin and cargo box arrangements to offer a variety of options for potential customers' needs. Common cabin configurations include, among others, crew and quad cab configurations. These configurations generally result in lengthening the cabin so as to accommodate a rear seat assembly. Often, when one of these configurations is selected, a smaller cargo box, such as a short bed, is selected in an attempt to offset the increased cabin length so as to not increase an overall length of the vehicle. This overall configuration of a crew cab or quad cab accompanied by a shorter box has certain benefits such as not increasing the overall length of the vehicle, but it also has certain drawbacks such as less cargo storage space.

In addition, in the club, crew and quad cabin configurations that include a rear seat arrangement, often there is not an abundance of interior cabin storage. The rear seat arrangements in these interior cabin configurations generally take up a majority of the interior space provided behind the front seats and therefore provide little or no space for storage.

Thus there is a need for a vehicle cabin and cargo bed arrangement that overcomes the aforementioned and other disadvantages.

SUMMARY OF INVENTION

Accordingly, an arrangement for expanding a cargo box of a pick-up truck vehicle is provided. The arrangement includes a wall that defines a cabin space on an internal side and a cargo box end on an external side, and the wall is arranged to be translateable from a first position to a second position. A latch mechanism is provided and attached to the wall. The latch mechanism is arranged to maintain the wall in the first position. A release mechanism is coupled to the latch mechanism and arranged to selectively release the wall from the first position such that the wall can translate into the cabin and towards a front of the vehicle to a second position and extend a length of the cargo box.

In accordance with another aspect of the present invention, an arrangement is provided to move a rear seat member adjoined to the cabin prior to extending the length of the cargo box.

BRIEF DESCRIPTION OF DRAWINGS

Other aspects, features, and advantages of the present invention will become more fully apparent from the following detailed description of the preferred embodiment, the appended claims, and in the accompanying drawings in which:

DETAILED DESCRIPTION OF EXEMPLARY EMBODIMIENT

Figure 1:
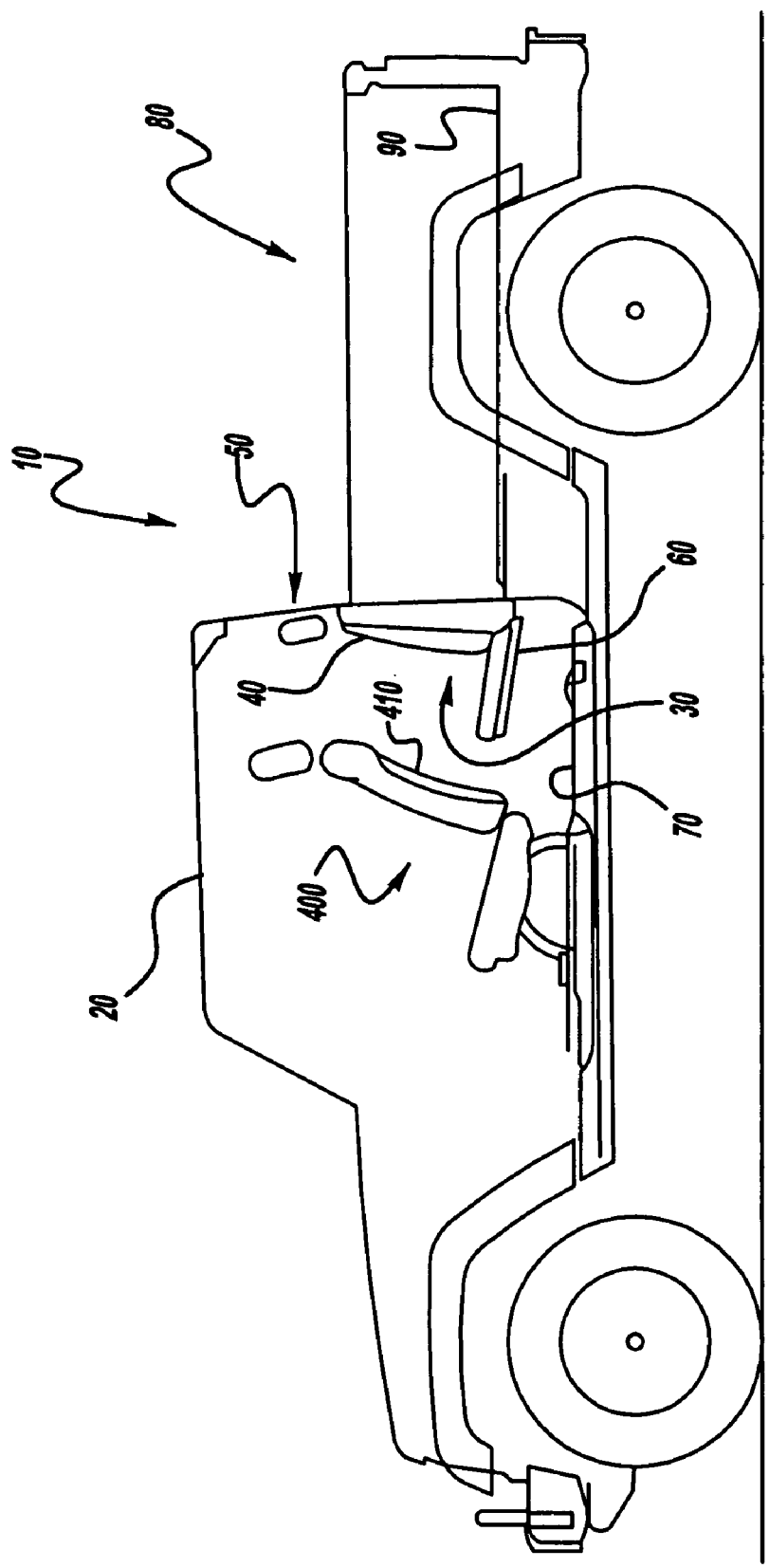
FIG. 1 illustrates a partial side view of a pick-up truck vehicle having a rear seat arrangement in accordance with the present invention.
Figure 2:
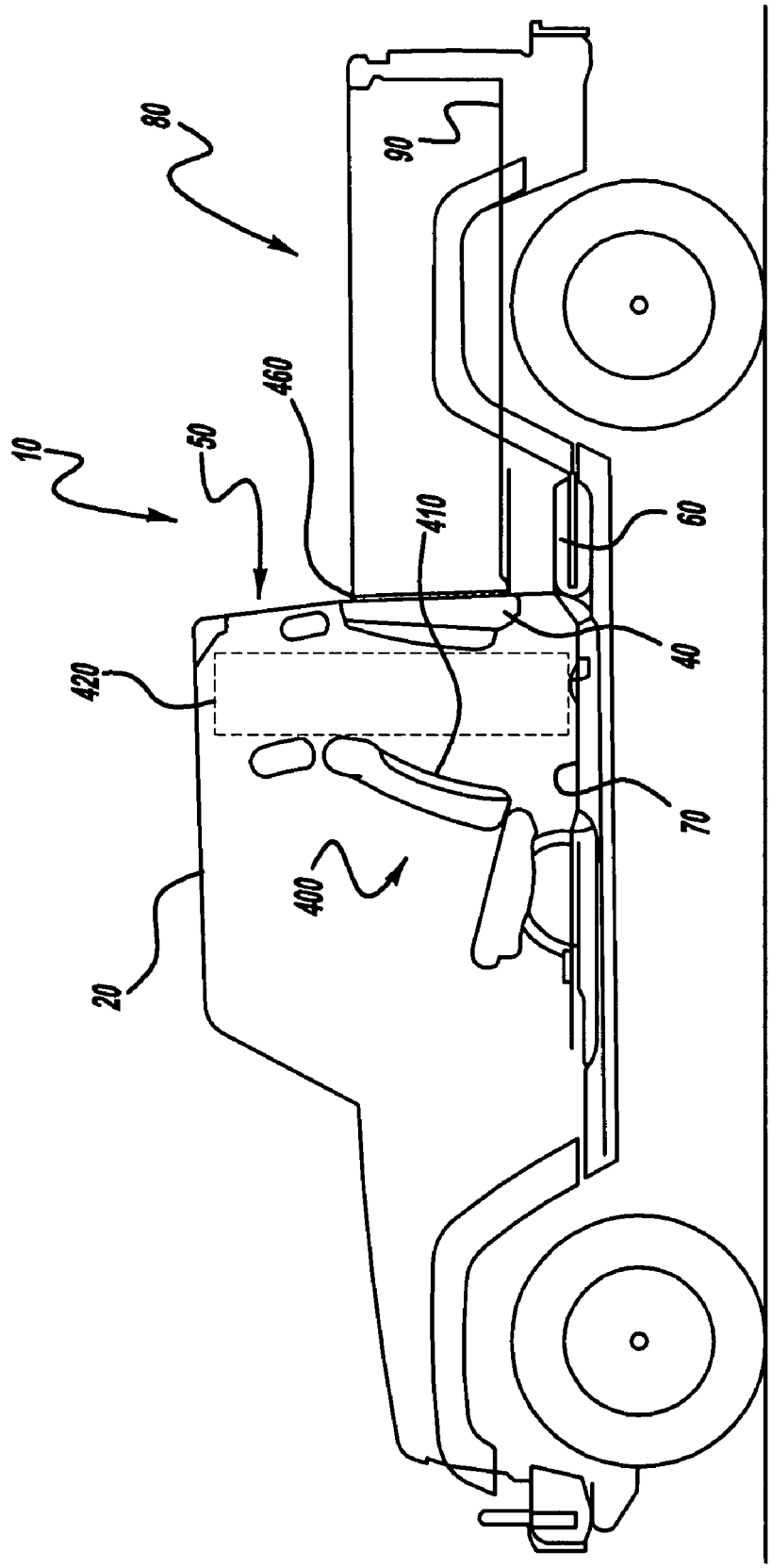
FIG. 2 illustrates a partial side view of the pick-up truck vehicle of FIG. 1 with a rear seat bottom translated to increase storage in accordance with the present invention.
Figure 3:
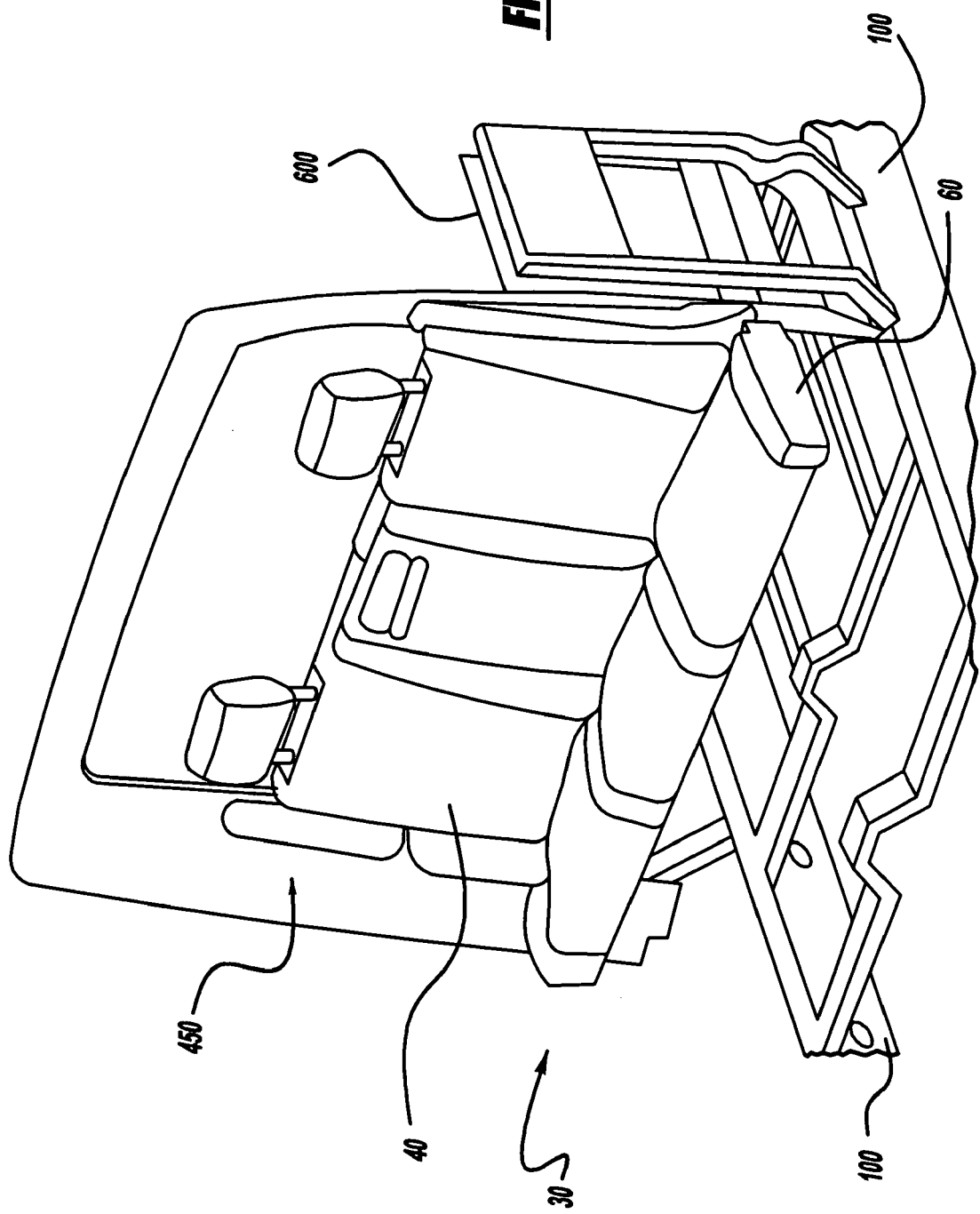
FIG. 3 illustrates a partial isometric view of the rear seat arrangement in a seating position in accordance with the present invention.

In the following description, several well-known features of a pick-up truck vehicle are not shown or described so as not to obscure the present invention. Referring now to the drawings, FIGS. 1–3 illustrate an exemplary embodiment of a pick-up truck vehicle 10 having a cabin 20 with a rear seat arrangement 30 for increasing the interior storage space of cabin 20. In accordance with one aspect of the present invention, rear seat arrangement 30 includes a seat back member 40 positioned relative to a rear wall assembly 50 of cabin 20 and a seat bottom member 60 positioned relative to seat back member 40 and a floor 70 as best shown in FIG. 1. Vehicle 10 also includes an external truck cargo box 80 with a load bed 90 and frame rails 100.

Figure 4:
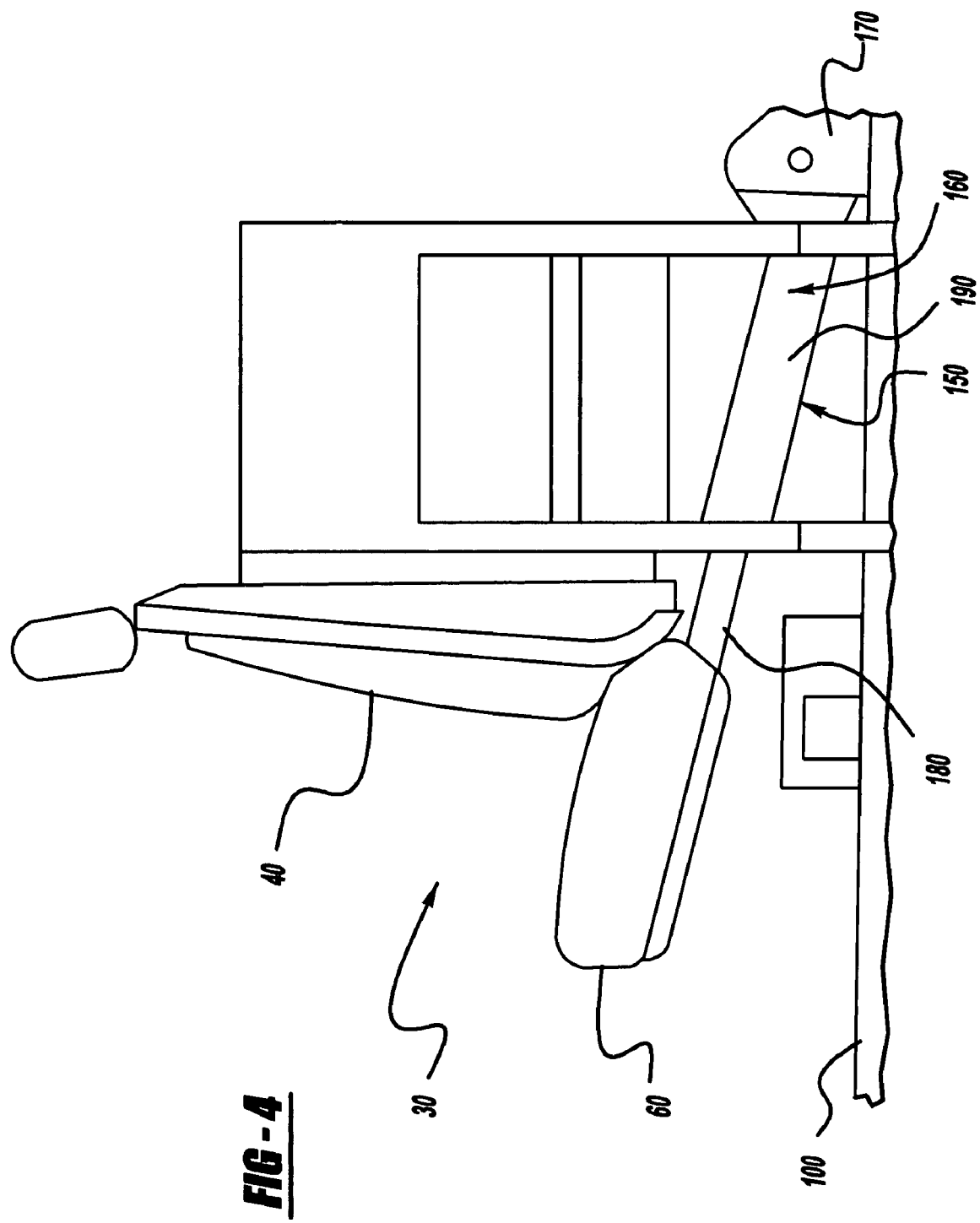
FIG. 4 illustrates a partial side view of the rear seat arrangement in a seating position in accordance with the present invention.

Seat bottom member 60 is attached to a pair of articulateable track mechanisms 150 in two places relative to the driver side and passenger side frame rails 100 as best shown in FIGS. 3 and 4. Track mechanism 150 includes a telescoping frame assembly 160 and a pivotable attachment 170. Telescoping frame assembly 160 includes a first frame member 180 attached to seat bottom member 60 and a second frame member 190 pivotable attached to the vehicle frame rails 100 via pivot attachment 170 as best shown in FIG. 4. Second frame member 190 is hollow and is arranged to receive first frame member 180 in a telescoping fashion.

Figure 5:
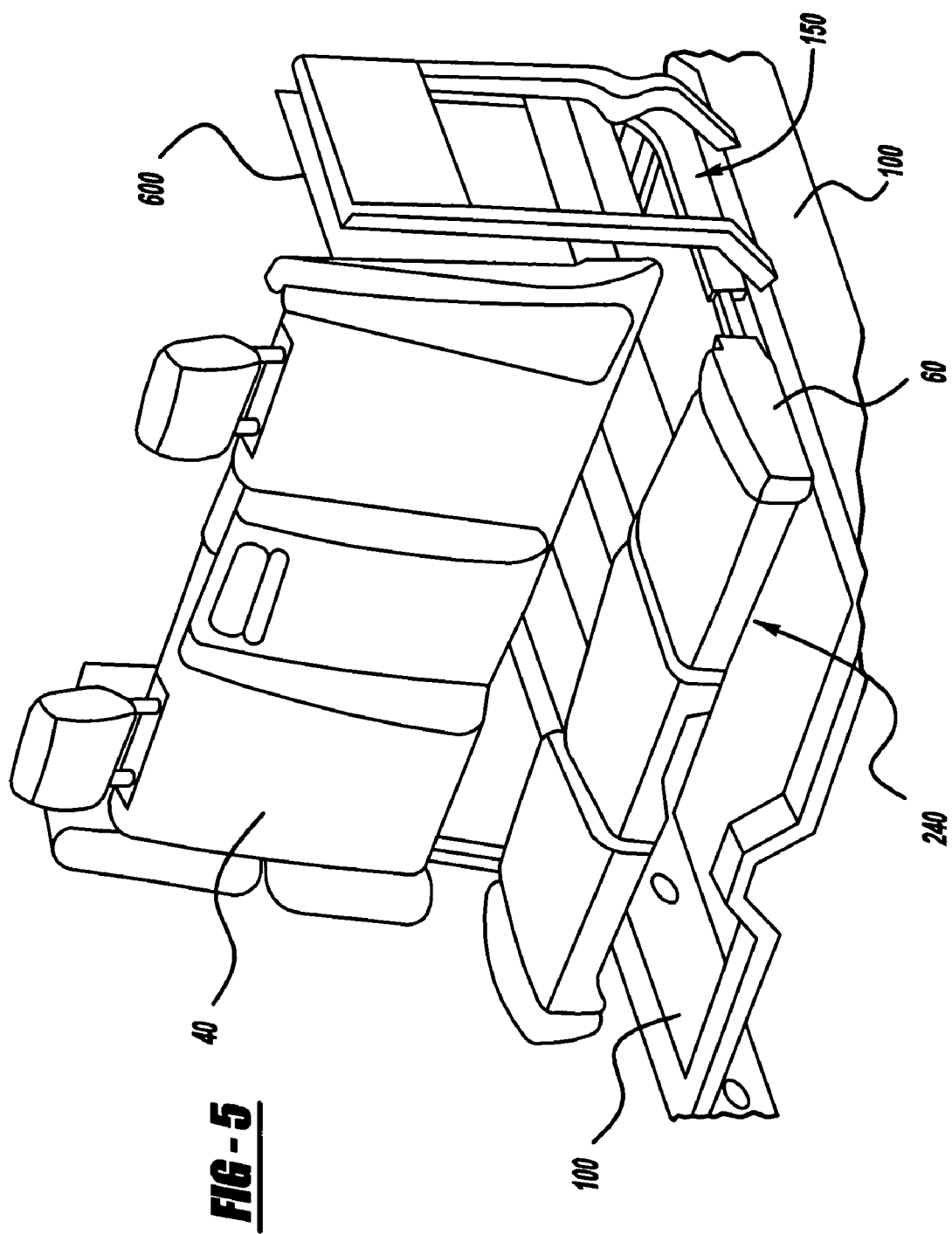
FIG. 5 illustrates a partial isometric view of the rear seat arrangement in a translatable position in accordance with the present invention.
Figure 6:
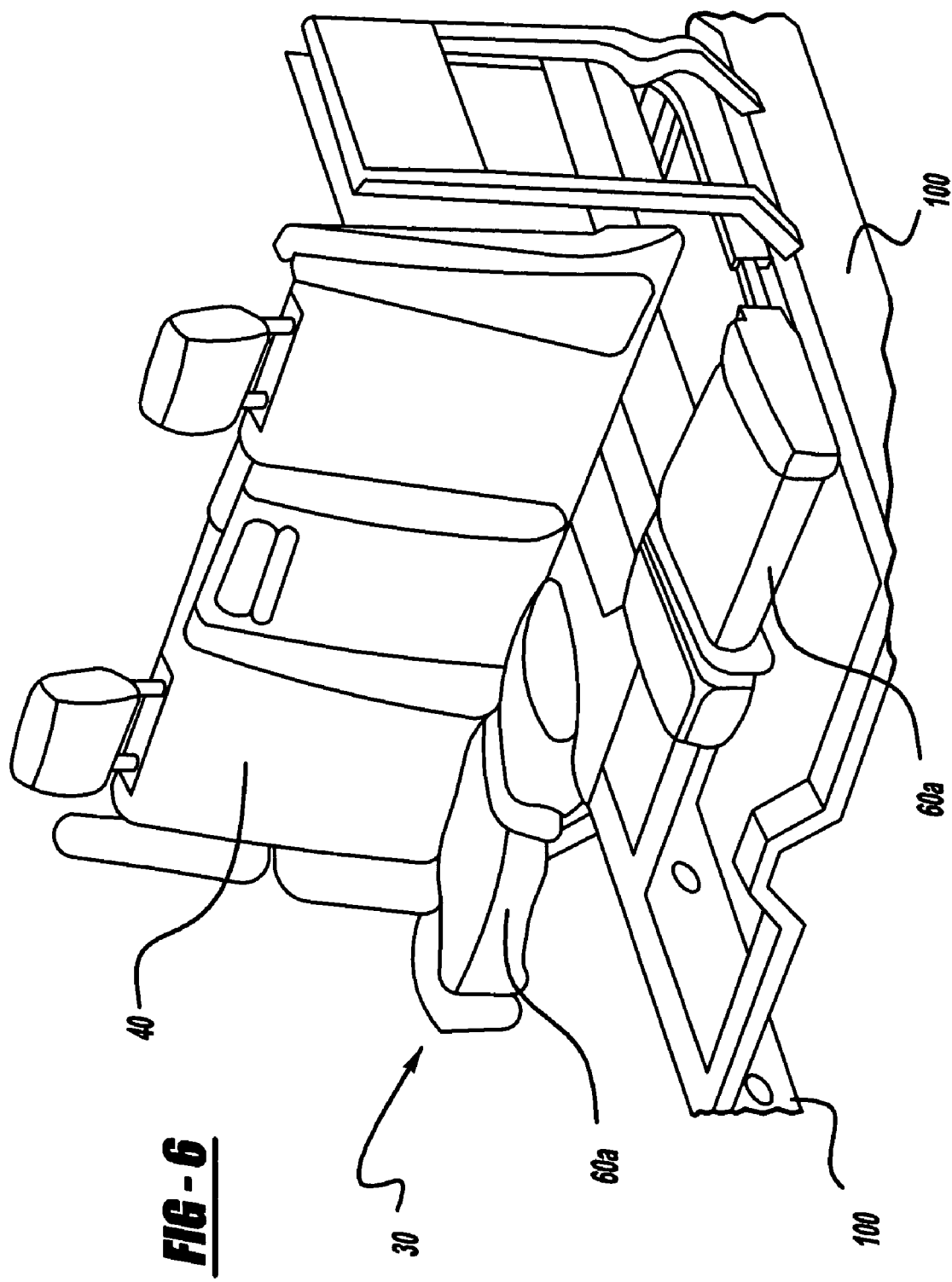
FIG. 6 illustrates a partial isometric view of a split seat configuration rear seat arrangement in accordance with the present invention.

It is envisioned that seat bottom member 60 can be either a bench style arrangement as best shown in FIG. 5 or a split seat arrangement 60a as best shown in FIG. 6 with the track mechanism 150 coupled to seat bottom member 60 or split seat bottom member 60a.

Figure 7:
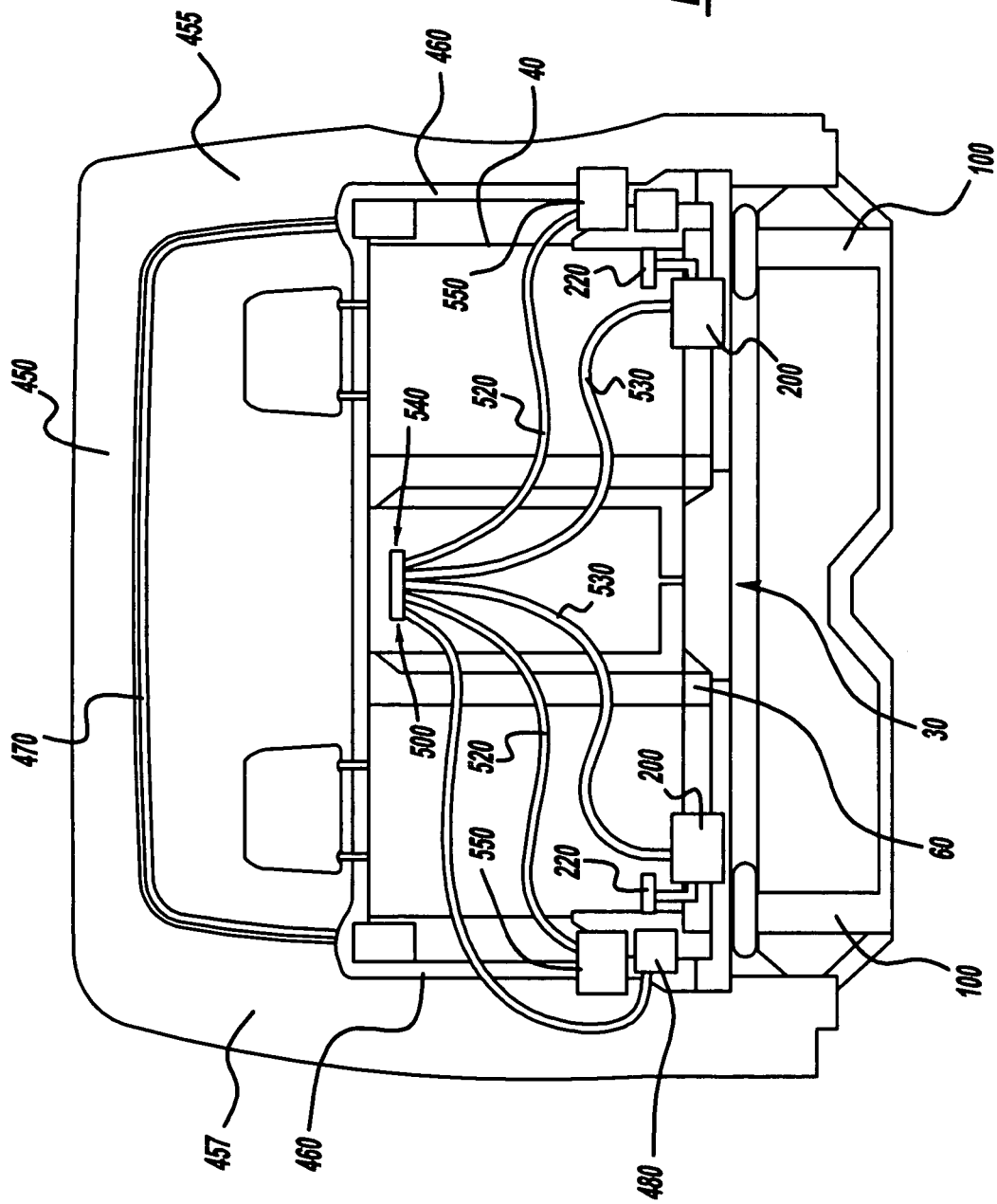
FIG. 7 illustrates a partial front view of the rear seat arrangement and cargo bed extension arrangement in accordance with the present invention.
Figure 8:
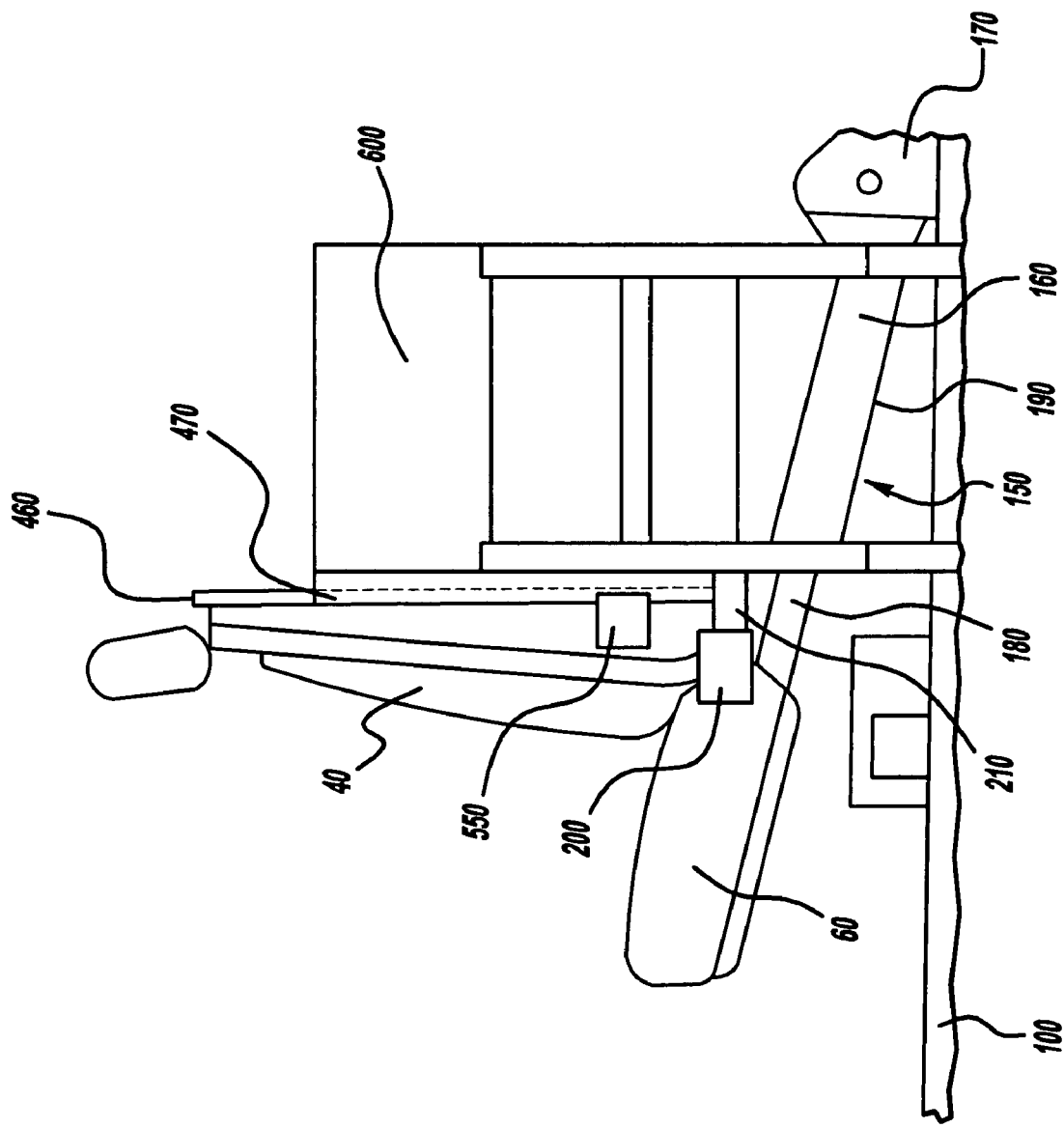
FIG. 8 illustrates a partial side view of the rear seat and cargo bed extension arrangements in accordance with the present invention.

A set of seat bottom latch mechanisms 200 are coupled to seat bottom member 60 and vehicle frame member 210 as best shown in FIGS. 7 and 8. Latch mechanisms 200 can be any latch device capable of coupling two members in a selectably releasable manner, such as typical door latch arrangements 200 used in this exemplary embodiment. Latch mechanisms 200 are connected to tethers 220 such that upon pulling tethers 220, latch mechanisms 200 will detach from frame member 210 and allow seat bottom member 60 to pivot via track mechanism pivot assembly 170 from a seating position 230 to a translatable position 240 as best shown in FIG. 4. If seat bottom member 60 consists of a bench seat configuration, pulling on tethers 220 will simultaneously release both latch mechanisms 200. If seat bottom 60 is a split seat configuration 60a, separate tethers will be utilized for latch mechanisms 200, one for driver side latch mechanism 200 and one for passenger side latch mechanism 200. In this configuration, each split seat portion 60a of seat bottom member 60 can be separately released and allowed to pivot to a translatable position as described above and best shown in FIG. 6.

Figure 9:
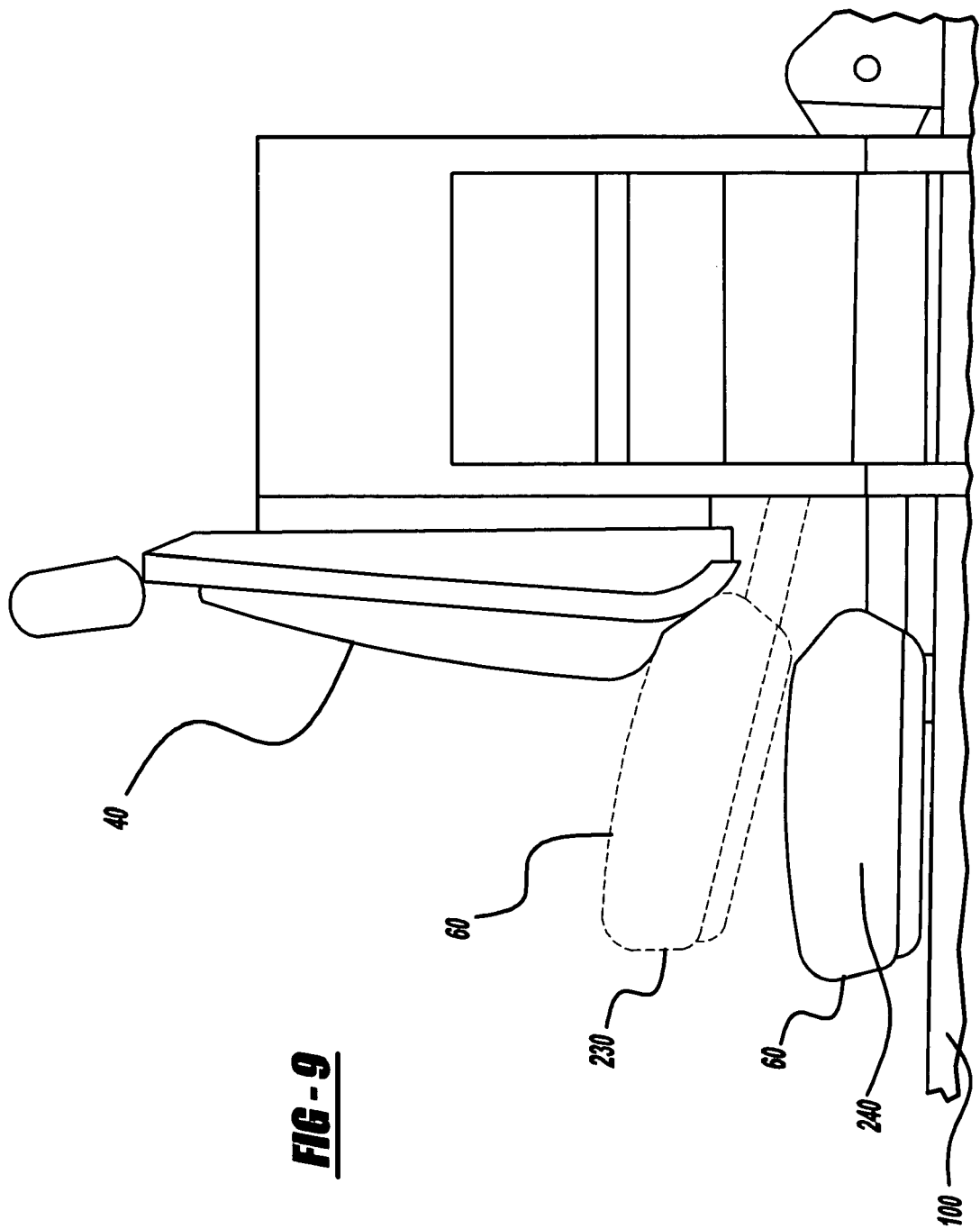
FIG. 9 illustrates a partial side view of the rear seat arrangement in both a seating and a translatable position in accordance with the present invention.
Figure 10:
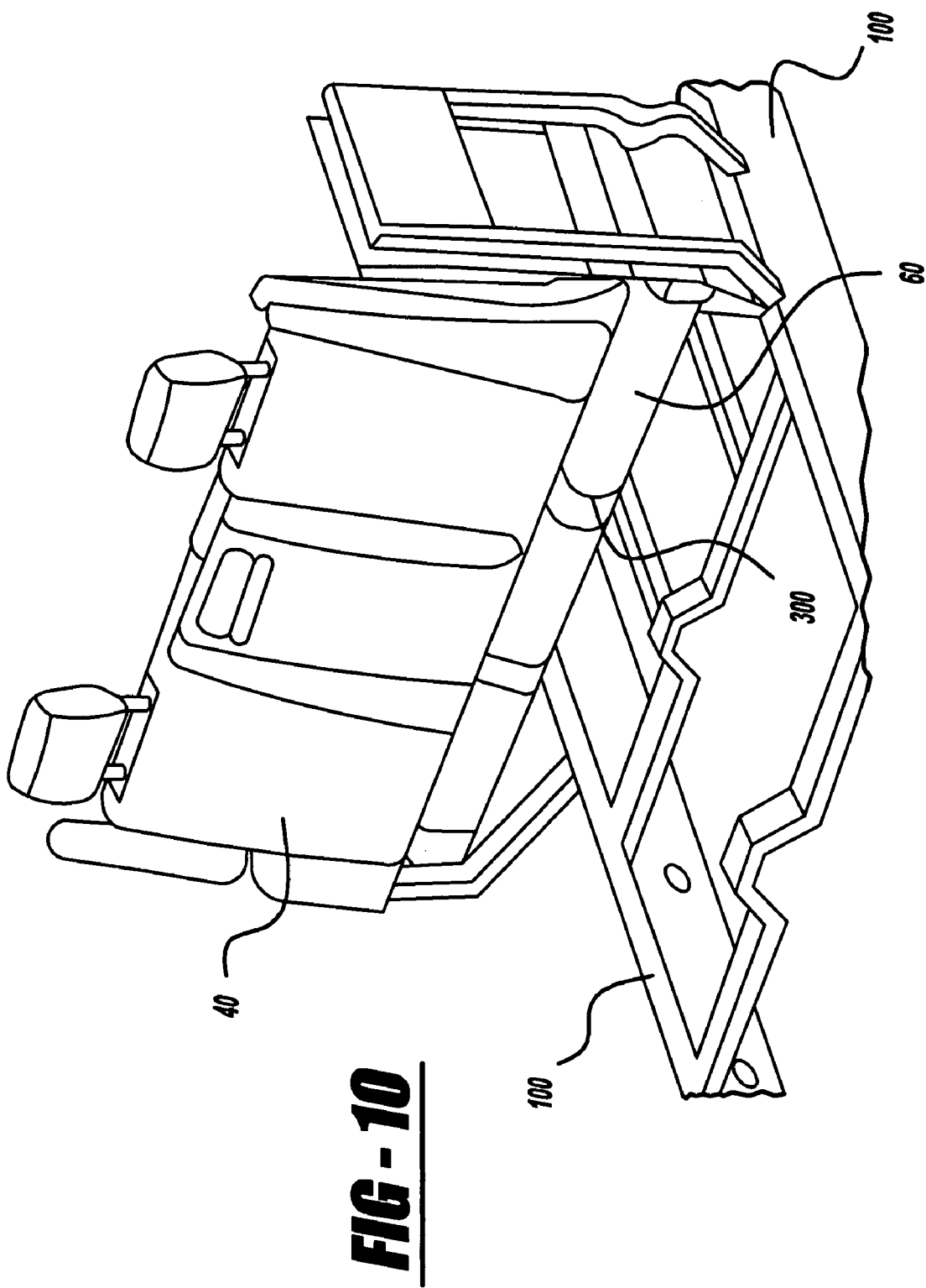
FIG. 10 illustrates a partial isometric view of the rear seat arrangement with the rear seat bottom in a stowed position in accordance with the present invention.
Figure 11:
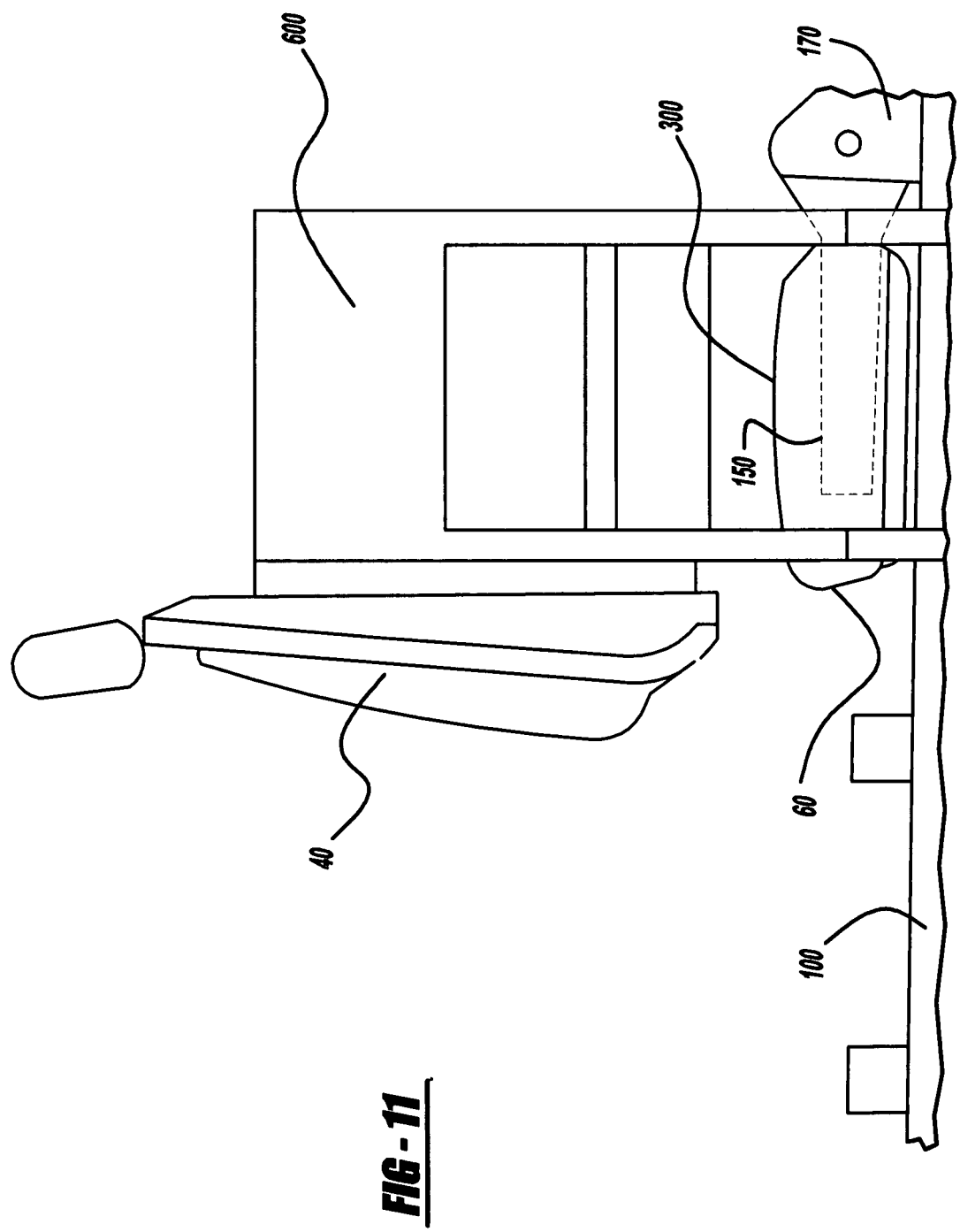
FIG. 11 illustrates a partial side view of the rear seat and cargo bed extension arrangements with the rear seat bottom in a stowed position in accordance with the present invention.

Once seat bottom member 60 is in a translatable position 240 as best shown in FIGS. 5 and 9, seat bottom member 60 can now be translated via telescoping track mechanisms 150 rearward outside of cabin 20 to a storage position 300 located behind rear cabin wall assembly 50 and under truck cargo bed floor 90 as best shown in FIGS. 2, 10 and 11.

In operation, seat bottom member 60 can be released from a seating position and translated to a storage position adjoined to the cabin and underneath the bed of the pick-up truck. This effectively creates an increased storage area 420 of the cabin interior between a seat back portion 410 of a driver seat 400 and the rear seat back member 40 as best shown in FIG. 2.

In accordance with another aspect of the current invention, the rear seat arrangement 30 cooperates with a cargo bed arrangement to increase storage of the pick-up truck cargo bed. Referring now to FIGS. 7 and 12–14, rear cabin wall assembly includes a frame portion 450, a midgate portion 460 and a window 470. Window 470 is slideably coupled to midgate 460 and is arranged to mate with frame portion 450 in a closed position and retract into midgate 460 in an open position. Midgate portion 460 extends from a driver side 455 of frame portion 450 to a passenger side 457 of frame portion 450 as best shown in FIG. 7. Midgate portion 460 can form both part of a rear wall of cabin 20 and a forward end of cargo box 80 or just a rear wall of the cabin.

A release mechanism 500 is positioned in seat back member 40 and is attached to rear cabin wall assembly midgate portion 460. Midgate portion 460 is releasably coupled to side frame portion 450 via typical latch mechanisms 550, such as automotive door latch mechanisms, positioned at the passenger side 457 and the driver side 455 of frame portion 450. Release mechanism 500 is coupled to latch mechanisms 550 and via cable conduits 520. Release mechanism 500 is further coupled to seat bottom latch mechanisms 200 via cable conduits 530. Release mechanism 500 includes a handle 540 arranged to engage latch mechanisms 200 and 550 and simultaneously release seat bottom member 60 to a translatable position (as previously described) and release rear cabin midgate 460 from frame portion 450. Seat bottom member 60 is then translated into stowed position 300 as described above.

Before midgate 460 can be translated into cabin 20 and towards a forward end of the vehicle, rear window 470 has to be lowered into midgate 460. To ensure that midgate 460 is not translated while window 470 is still engaged to frame portion 450, a mechanical lockout assembly 480 is incorporated into midgate 460 as best shown in FIG. 7. Lockout assembly 480 can be any mechanism capable of sensing that window 470 has contacted the lockout assembly and then sending a mechanical or electrical signal to latch assembly 500 to allow latch assembly 500 to engage latch mechanisms 550 and release midgate 460 from frame 450 when handle 540 is actuated. For the present invention, a cam assembly is contemplated with one end of the cam arranged to be contacted by window 470 when it is in a down position and the other end of the cam mechanically linked to release assembly 500.

Figure 12:
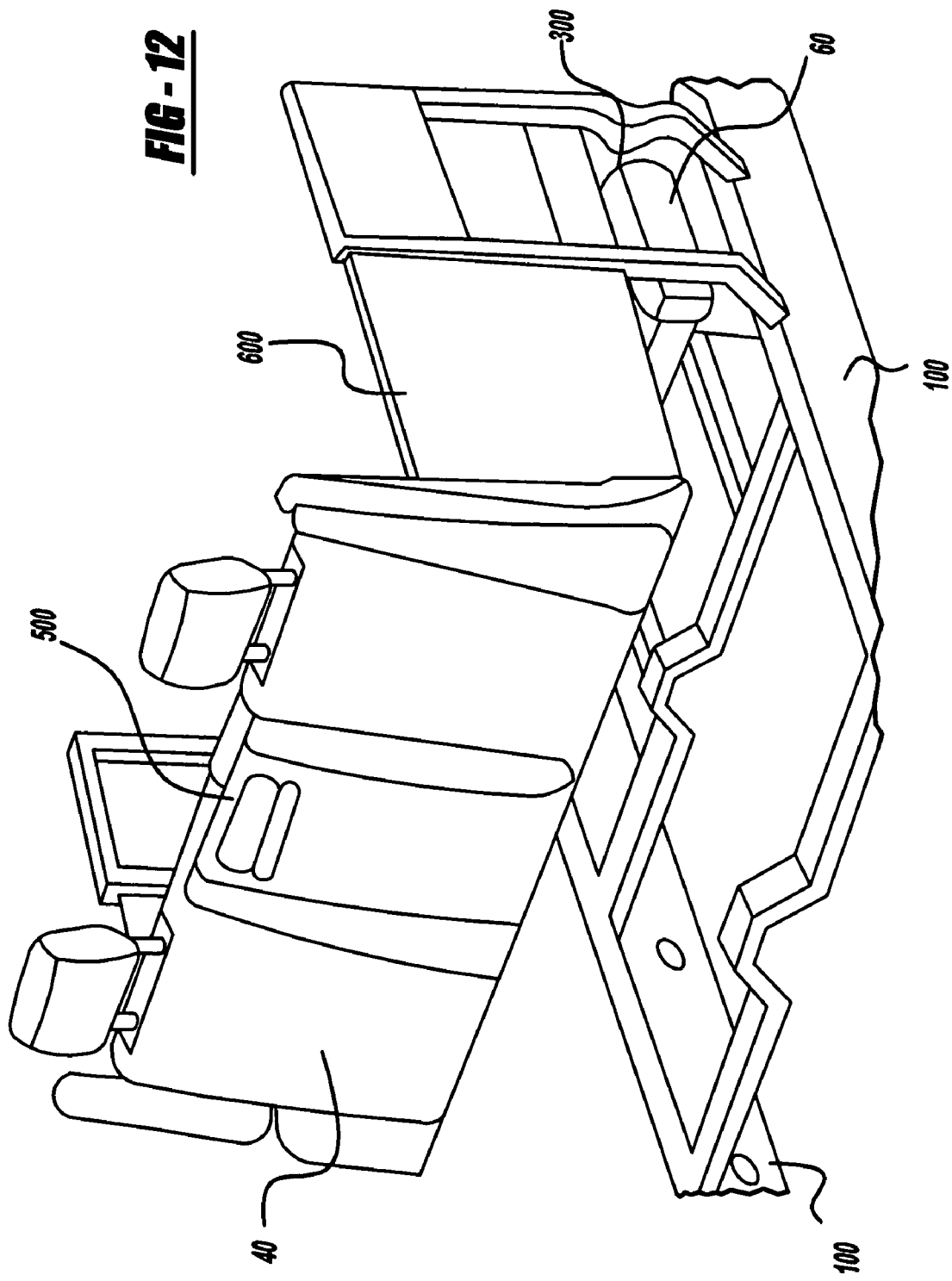
FIG. 12 illustrates a partial isometric view of the rear seat and cargo bed extension arrangements with the rear seat bottom in a stowed position and a midgate in an extended position in accordance with the present invention.
Figure 13:
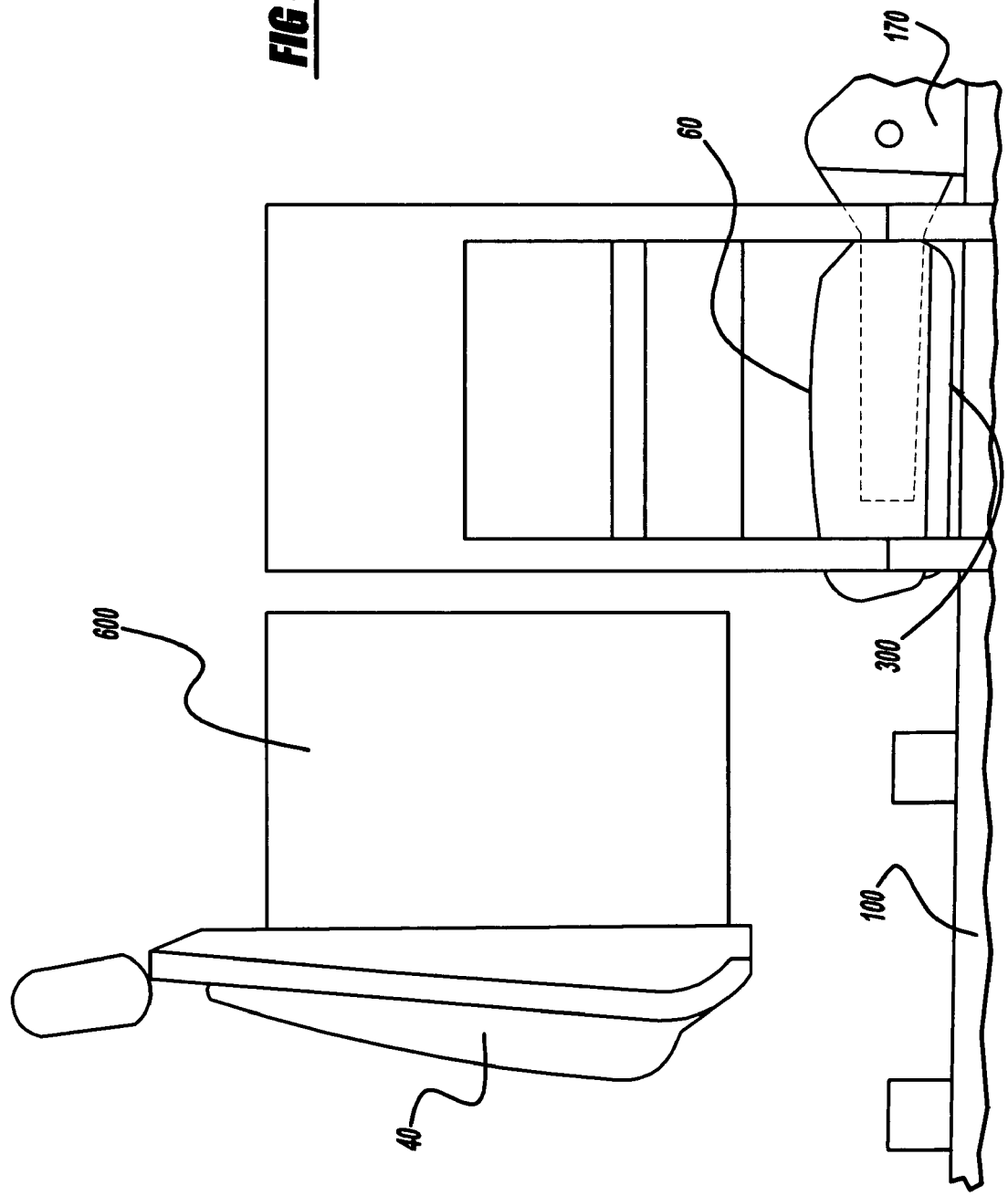
FIG. 13 illustrates a partial side view of the rear seat and cargo bed extension arrangements with the midgate in an extended position and the rear seat bottom in a stowed position in accordance with the present invention.
Figure 14:
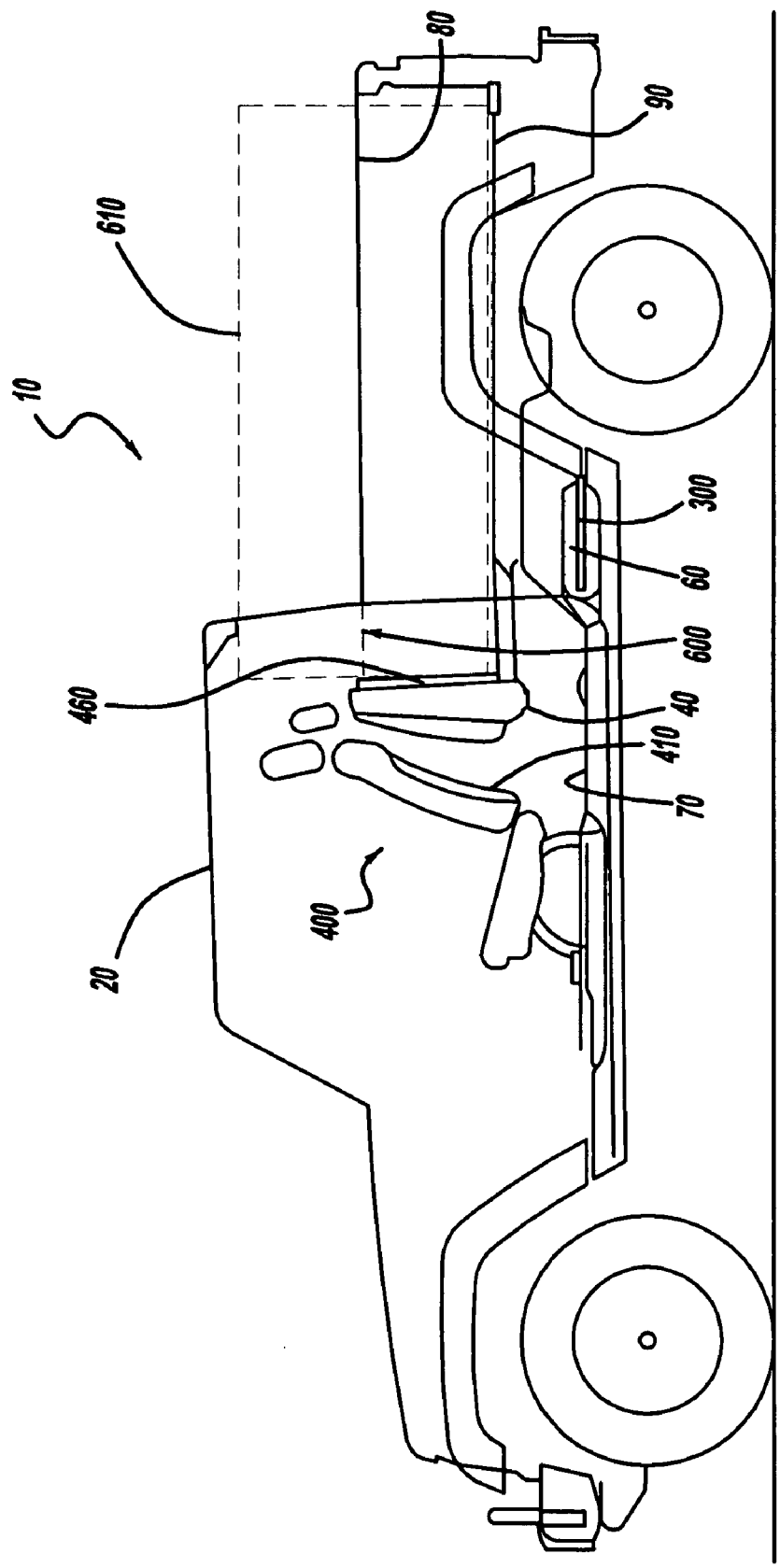
FIG. 14 illustrates a partial side view of the pick-up truck vehicle with the midgate extended the rear seat bottom stowed in accordance with the present invention.

With rear window 460 in a down position, midgate portion 460 can now be translated forward towards a front of the cabin to extend the cargo area of cargo box 80 until seat back member 40 substantially mates with a seatback portion 410 of driver side front seat 400 as best shown in FIGS. 6 and 12–13. A cargo bed extension panel assembly 600 is attached to rear cabin wall 50 and includes driver and passenger side panels and a cargo bed floor panel as best shown in a side view of FIG. 13. Extension panel assembly 600 is arranged to telescopically extend from the sides and floor of the cargo box 80 and effectively creates an extended cargo storage area 610 by extending the cargo box into the interior of cabin 20 as midgate 460 is translated forward as best shown in FIG. 14.

Returning seat bottom member 60 and midgate portion 460 to their respective seating configuration positions (as best shown in FIG. 3) is accomplished by first translating the midgate 460 towards a rear of the vehicle until latch mechanisms 550 reengage side frame 450. As midgate 460 is translated rearward, extension assembly 600 telescopically slides rearward underneath and outboard of the load bed surface and side panels of cargo box 80, respectively. Next, seat bottom member 60 is translated forward and then raised towards a roof of the vehicle until latch mechanisms 200 reengage frame member 210.

The foregoing description constitutes the embodiments devised by the inventors for practicing the invention. It is apparent, however, that the invention is susceptible to modification, variation, and change that will become obvious to those skilled in the art. Inasmuch as the foregoing description is intended to enable one skilled in the pertinent art to practice the invention, it should not be construed to be limited thereby but should be construed to include such aforementioned obvious variations and be limited only by the proper scope or fair meaning of the accompanying claims.

What is claimed is:

1. An arrangement for expanding a cargo box of a pick-up truck vehicle, the arrangement comprising:
   a wall that defines a cabin space on an internal side and a cargo box end on an external side, the wall arranged to move from a first position to a second position;
   a latch mechanism attached to the wall and arranged to maintain the wall in the first position;
   a release mechanism coupled to the latch mechanism and arranged to selectively release the wall from the first position such that the wall can move into the cabin and towards a front of the vehicle to a second position and extend a length of the cargo box;

a cargo box having a load floor member attached to the vehicle and a pair of side panel members positioned perpendicular to the load floor member on a driver side and a passenger side of the cargo box; and a pair of side extension panels and a load floor extension panel attached to the wall and arranged to be translateable relative to the cargo box side panel members and the load floor member from a non-deployed to a deployed position such that when the wall is moved from the first position to the second position, the side and load floor extension panels translate to extend the cargo box;

wherein the side extension panels are positioned parallel to the cargo box side panel members and the load floor extension panel is positioned parallel to the cargo box load floor member.

2. The arrangement of claim 1, wherein the wall comprises a midgate portion and a window portion, the midgate portion arranged to slideably receive the window portion.

3. The arrangement of claim 2, further comprising a lockout assembly, the lockout assembly coupled to the latch mechanism and the release mechanism and arranged to prevent the release mechanism from engaging the latch mechanism when the window is in a closed position.

4. The arrangement of claim 1, wherein the latch mechanism comprises a pair of latch mechanisms arranged to maintain the rearward wall in a first position.

5. The arrangement of claim 1, wherein the release mechanism is positioned in a seat back member attached to the internal side of the wall.

6. The arrangement of claim 1, further comprising a rear seat arrangement including:

a seat bottom member;

a seat bottom member latch mechanism attached to the seat bottom member and coupled to the release mechanism, and arranged to maintain the seat bottom member in a deployed seating position; and a track mechanism attached to the seat bottom member and extending externally through a wall of the cabin such that when the seat bottom member is selectively released, the seat bottom member can move along the track mechanism to a stored position external to the cabin;

wherein the release mechanism is arranged to release both the wall and the seat bottom member latch mechanisms.

7. The arrangement of claim 6, wherein the release mechanism is positioned in a seat back member attached to an internal side of the wall.

8. The arrangement of claim 6, wherein the track mechanism comprises:

a first member attached to the seat bottom member on one end;

a pivot assembly attached to a frame of the vehicle external to the cabin;

a second member attached to the pivot assembly on one end and slideably coupled to another end of the first member and arranged to telescopically receive the first member upon translation of the seat bottom to the stowed position.

* * * * *